United States Patent [19]

Krave

[11] 4,292,761
[45] Oct. 6, 1981

[54] METHOD, APPARATUS AND PACKAGE FOR SPROUTING SEEDS

[76] Inventor: Carl A. Krave, 5531 Limeric Cir., #16, Wilmington, Del. 19808

[21] Appl. No.: 135,872

[22] Filed: Mar. 31, 1980

Related U.S. Application Data

[63] Continuation-in-part of Ser. No. 58,820, Jul. 19, 1979.

[51] Int. Cl.³ .............................................. A01G 31/02
[52] U.S. Cl. .......................................... 47/14; 47/64; 47/84
[58] Field of Search ...................................... 47/14–16, 47/59, 64, 56, 84

[56] References Cited

U.S. PATENT DOCUMENTS

| | | | |
|---|---|---|---|
| 2,876,588 | 3/1959 | Tietz et al. | 47/56 X |
| 3,608,238 | 9/1971 | Reuter | 47/64 |
| 3,703,786 | 11/1972 | Swan | 47/56 |
| 4,006,557 | 2/1977 | Sawyer | 47/14 X |
| 4,075,785 | 2/1978 | Jones | 47/64 |

*Primary Examiner*—Robert E. Bagwill
*Attorney, Agent, or Firm*—Connolly and Hutz

[57] ABSTRACT

Seeds are sprouted within a cup-shaped container to confine and entangle them in a packable group. The seeds are uniformly spread across the bottom of the container with the aid of an upwardly directed light source. The bottom of the container is porous and a flow of air maintained through it during sprouting. The sprouts are entangled by growing in a porous hydrophobic foam or tilting the bottom of the container to several angles for the sprouts to mature. After maturing, the entangled sprouts are dumped from the container and wrapped under tension to provide a strong compact resilient package in a wrapper sheet which is folded over itself and sealed by heat sealing, twisting or crimping.

20 Claims, 18 Drawing Figures

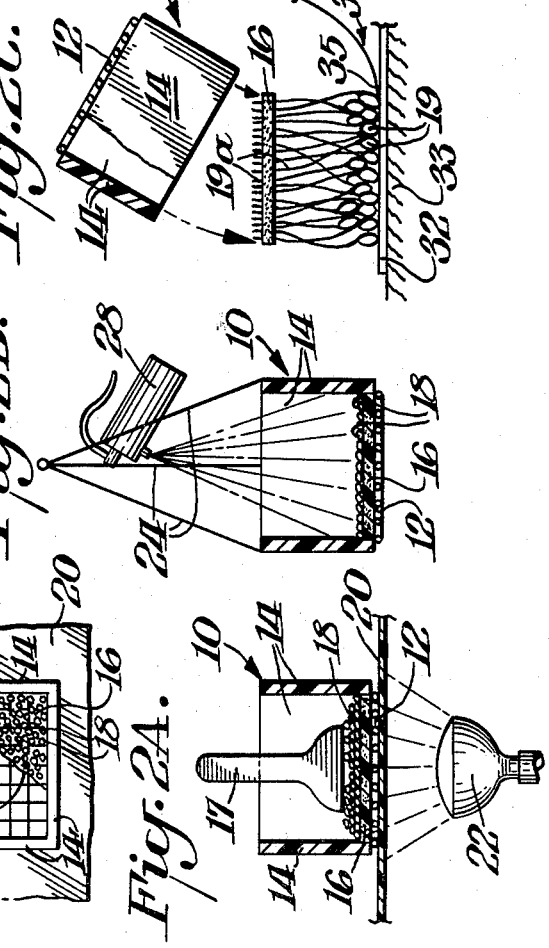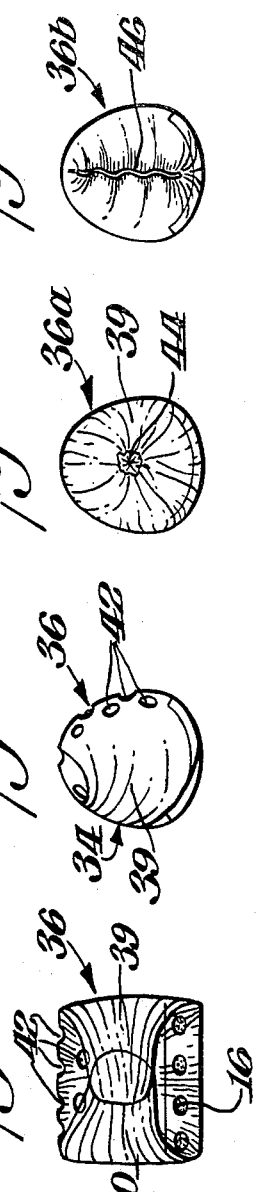

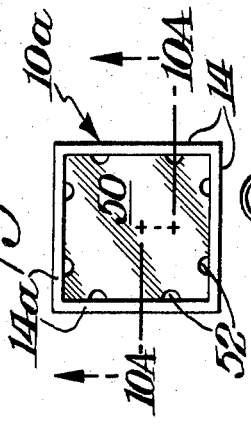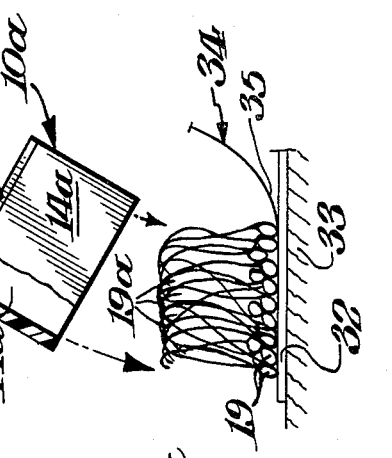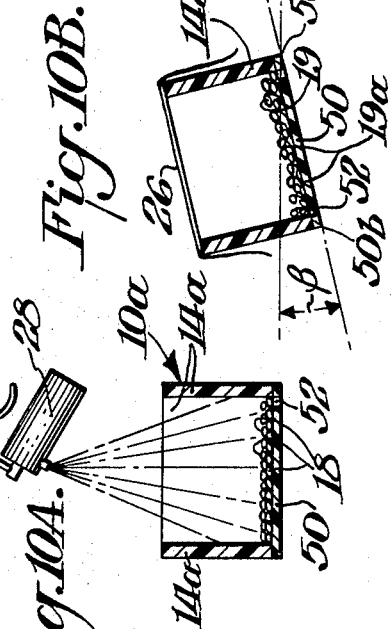

METHOD, APPARATUS AND PACKAGE FOR SPROUTING SEEDS

CROSS REFERENCE TO RELATED APPLICATIONS

This application is a continuation-in-part of copending application Ser. No. 58,820, filed July 19, 1979 by the same inventor.

BACKGROUND OF THE INVENTION

The present invention provides method and apparatus for growing, packaging and storing sprouts from the seeds of legumes, grains and vegetables in a simple efficient manner.

The acceptance of sprouts as food is influenced by their taste and appearance. Fresh sprouts are easily damaged and may rapidly lose their nutritional value, flavor and natural crispness in handling, transport and storage prior to consumption.

Fresh sprouts are commonly transferred from the original growth apparatus to another container for packaging and storage. Frequently, the mature sprouts are lumped together in a container which is low in cost but provides little structural support (e.g., a polyethylene bag). To protect delicate spout parts from bruising and damage, sprouts may be grown within or transferred to containers composed of rigid members which may provide significantly more structural support. However, these rigid containers may be excessively expensive and may require relatively larger amounts of space for storage.

An object of this invention is to provide an efficient method, apparatus and package for sprouting seeds and storing sprouts relatively free from damage, decay and deformation.

SUMMARY

In accordance with this invention, mature sprouts are arranged in a fashion which allows for the deposition of a wrapper sheet in a manner such that the tension provided by the disposed and secured wrapper sheet yields a resilient and durable apparatus for handling, transporting and storing sprouts.

The presence of tension provided by the particular disposition of the wrapper sheet acts to: (1) reduce the overall surface area of the apparatus, minimizing the amount of space necessary for storage and transport, (2) crowd the sprouts together in an arch-like fashion such that the contiguous placement of similarly circumflexed sprouts provides added strength and resilience to the apparatus, (3) provide resilience to the apparatus by the presence of trapped gases (e.g., air) where, even with the presence of a number of small perforations in the wrapper sheet, the apparatus may act as a resilient "bubble", (4) retard excessive growth of mature sprouts (which may cause an undesirable taste and appearance) which might otherwise occur in a more expensive apparatus during storage or transport under certain conditions of temperature, humidity and light.

The particular arrangement of mature sprouts which may accommodate the desired disposition of the wrapper sheet may be accomplished through the use of a nonporous platform as a base for growing sprouts, where the base/platform may be tilted at varying angles several times during the growth process. The resulting interwoven structure of root parts may serve to hold the mature sprouts in a desirable arrangement for the proper disposition of the wrapper sheet.

A pad of porous material may serve as a base for the sprouts as they grow. The porous material is hydrophobic and nonabsorbent. It has a high percentage of interconnected voids providing a high degree of permeability to fluid flow and surface properties which retain adhered droplets of moisture sufficient to provide a humid growing environment without retaining localized moisture which might promote decay or block free flow through the pad. Free drainage is, therefore, promoted through and away from the pad. A particularly effective pad is provided by a hydrophobic fully reticulated elastomeric and hydrophobic polyurethane foam with uniform pores. Such pores may range in size, for example, from about 8 PPI (pore per inch) to 50 PPI. The sprout-impregnated pad may serve to hold the mature sprouts in a desirable arrangement for the proper disposition of the wrapper sheet and may become an integral component of the apparatus.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which:

FIG. 1 is a top plan view of a germination tray with a porous bottom, supporting a germination pad partially broken away over a light source, which illustrates one embodiment of this invention;

FIGS. 2A–2F illustrate various steps for the preparation of the germinating tray shown in FIG. 1 from sprout growth through to the wrapped product;

FIG. 2A is a cross-sectional view taken through FIG. 1 along the line 2A—2A, showing the sprouts being leveled on the germinating pad with the aid of a light source;

FIG. 2B is a cross-sectional view showing the germinating tray with supporting wires and misting of seeds;

FIG. 2C illustrates the germinating tray inverted to deposit the fully germinated sprouts and germinating pad for wrapping;

FIG. 2D is an end-elevational view showing the wrapper partially enclosing the germinated sprouts;

FIG. 2E is an end-elevational view showing the germinating sprouts almost totally enclosed in a wrapper;

FIG. 2F is an end-elevational view of the germinated sprouts completely wrapped;

FIG. 3 is a side-elevational view of the partially wrapped sprout package with a double layer of wrapper along part of its length as shown in FIG. 2F;

FIG. 4 is similar to FIG. 3 with the wrapping material folded over on itself;

FIG. 5 is an end-elevational view of the wrapped package shown in FIG. 4;

FIG. 6 is an end-elevational view of another wrapped package wherein the wrapper ends are twisted and secured;

FIG. 7 is an end-elevational view of still another embodiment of the wrapped package wherein the ends are crimped or heat sealed;

FIG. 8 is a fragmental cross-sectional view showing the porous bottom of the germinating tray and pad resting on a substantially open platform;

FIG. 9 is a top plan view of another germinating tray with a substantially non-porous bottom containing several openings for drainage which is another embodiment of this invention;

FIG. 10A is a cross-sectional view taken through FIG. 9 along line 10A—10A showing the germinating tray of FIG. 9 with sprout seeds being lightly misted;

FIG. 10B is a cross-sectional view of the germinating tray and sprout seeds shown in FIG. 9 with a tray shown tilted from the horizontal plane;

FIG. 10C is a cross-sectional view similar to FIG. 10B tilted in the opposite direction with seeds partially germinated; and FIG. 10D is a partial cross-sectional view showing the germinating tray inverted and the entwined sprouts deposited for wrapping.

DESCRIPTION OF THE PREFERRED EMBODIMENTS

Considering the drawings in more detail, FIGS. 1-7 shown one basic form of the apparatus and the sequential steps of growing sprouts 19 to maturity from seeds 18 to final packaging for transport and storage prior to consumption—in accordance with the invention.

A polyhedral germination pad 16 of porous material, contained within a germination tray 10, acts as a base for germinating seeds 18 and sprouts 19. Pad 16 and sprouts 19 are enclosed by a wrapper sheet, such as cover means 34. Wrapper sheet 34 is, for example, a polyethylene film or a polyvinyl chloride "stretch" film commonly used for wrapping fresh produce and other foodstuffs, and may contain a number of small perforations 42 to allow the free movement of fluids into and out of the package 36, as shown in FIGS. 3-5.

In FIGS. 1-2A a germinating tray assembly 10 is composed of a grill-like framework or screen 12 which is attached to the bottom side of the four-sided tray 10. Sides 14 of tray 10 may be composed of a rigid material, such as wood, plastic or other similar materials. Screen 12 may be composed of somewhat rigid metal or plastic wire or other similar material.

One or more germination pads 16 may be placed inside tray 10 and on top of screen 12 as in FIG. 2A. Seeds 18 which have been allowed to soak in warm water (e.g., 70°-80° F. for 6-8 hours) may be placed evenly onto pad 16 in a substantially uniform manner. A flat spreading tool 17 with at least one substantially straight edge facilitates the spreading of seeds 18 onto pad 16.

The presence of a transparent or translucent platform 20 upon which tray 10 may rest during the spreading of seeds 18 onto pad 16, allows for a more uniform distribution of seeds 18. Light passes through translucent platform 20 and through pad 16 and seeds 18, emitted from a light source 22 placed beneath translucent platform as in FIG. 2A. Viewed from above, the transmitted light provides an "X-ray" type image of the distribution of seeds 18 because more light is visible in areas of pad 16 which contain and support relatively fewer seeds 18. Tray 10, containing pad 16 and uniformly spread seeds 18 is then placed in a desirable germination environment.

A preferred platform for supporting tray 10 and its contents during germination will encourage the flow of fluids through the bottom of tray 10 (i.e., through screen 12) to facilitate removal of excess moisture from germinating seeds 18 and to facilitate seed respiration. For example, tray 10 may be supported from above by wire 24 or similar material attached to tray 10 as in FIG. 2B, or tray 10 may be supported from below by a platform 38 which may be substantially no more dense than screen 12, as in FIG. 8. Tray 10 may be slanted slightly away from the horizontal plane to facilitate drainage of excess moisture by gravity flow. Other supporting platforms (not shown) composed of, for example, nonporous materials may discourage the flow of fluids through and away from the bottom of tray 10 and pad 16 and may encourage the presence of undesirable amounts of moisture along the bottom of pad 16. The presence of large amounts of moisture along the bottom of pad 16 may encourage excessive and undesirable growth of sprout roots below and away from the pad. Excessive extension of sprout roots 19a may discourage easy removal of mature sprouts 19 from pad 16 and may detract from the overall appearance of apparatus 36. The presence of moisture predominating along contiguous and coaligned sprouts 19 during germination and growth, and the presence of moisture along and within the composite elements and structures of pad 16, rather than below pad 16, may encourage sprout growth upward and away from pad 16 and discourage excessive sprout root 19a growth downward and away from pad 16, as in FIG. 8.

The supported tray 10 may be periodically misted from above (e.g., four timer per day) by a watering can 28 as in FIG. 2B.

A temporary cover 26, as shown in FIGS. 10B and 10C, for example, of nonporous polyethylene film or of moistened paper towels, may be loosely placed over the top of tray 10 and to help retain moisture as needed and repositioned after each misting.

Mature sprouts 19 and pad 16 are removed from tray 10 by placing a sheet of rigid material 32 over the top of tray 10 and inverting tray 10 and rigid sheet 32 together in a manner which minimizes the movement of sprouts 19 and pad 16 within tray 10. The inverted tray 10 may be then removed from sprouts 19 and pad 16 by lifting tray 10 up and away from pad 16, as in FIG. 2C, leaving sprouts 19 and pad 16 free standing on rigid sheet 32, with sprout roots 19a on top. The sprout-impregnated pad 16 helps to hold together the mass of coaligned, mature sprouts for easy manipulation for wrapping and handling.

A wrapper sheet 34 may be disposed over the inverted pad-sprout assembly in a manner illustrated in FIGS. 2D-2F. In FIG. 2D, leading edge 35 of wrapper sheet 34 is disposed over the inverted pad-sprout assembly as trailing edge 37 is restrained. The circumfluent tension created by wrapper sheet 34 along lines perpendicular to leading and trailing edges 35 and 37, respectively, circumflexes pad 16 and bends the coaligned sprouts 19 as the pad-sprout-wrapper sheet assembly is lifted up and away from rigid sheet 32 and reverted to an upright position, as in FIG. 2E. The tension provided by the wrapper sheet 34 circumflexes pad 16 in a semi-cylindrical fashion, as in FIGS. 2E and 2F, and sprouts 19 are crowded together and bent in an arch-like fashion, with the top of sprouts grown on and containing roots impregnated within one part of the pad 16 touching the top of sprouts grown on and containing roots impregnated within other parts of the pad 16. This particular arrangement of the sprouts 19 provides added strength and resilience to the package 36, as contiguous placement of similarly circumflexed sprouts are coaligned for mutual reinforcement. This structural arrangement of arched sprouts may be enhanced as sprouts are moved from a relatively warm germination environment (e.g., 65°-80° F.) to a relatively cooler environment for storage or transport (e.g., 34°–54° F.) since the lower temperatures may tend to stiffen the plant sprouts 19. The presence of the pad 16 within package 36, as in FIG. 2F, adds protection to fragile sprout parts by acting as a barrier to objects threatening deformation. The ratio of the surface area of this pad-barrier relative to the total surface area of package 36 may be enhanced by the tension provided by the particular disposition of wrapper sheet 34.

When the leading edge 35 and trailing edge 37 of wrapper sheet 34 have been secured, the remaining wrapper sheet edges, shown in FIG. 3 as 39 and 40, may remain open and unsecured on opposing sides of the mass of circumflexed sprouts. It may be desirable to secure these edges 39 and 40 in a manner which provides lateral tension along wrapper sheet 34 along lines parallel to leading and trailing edges 35 and 37, respectively. One method of providing this lateral tension is depicted by package 36 in FIGS. 4 and 5. Edges 39 and 40 may be stretched and folded along a side of package 36 and may be secured with, for example, glue, tape or similar materials, or sealed by heat. Edges 39 and 40 may be secured along a side of package 36 which contains at least two layers of the wrapper sheet 34 as provided by the particular method of wrapper sheet enclosure, as depicted in FIGS. 2D–FIG. 5. This double layer of film provides a more durable surface for the adhesion of edges 39 and 40. Wrapper sheet 34 may contain a number of small perforations 42 as in FIGS. 3, 4 and 5 to allow the free movement of fluids into and out of package 36 (e.g., 50–100 perforations per square foot, measuring 1–3 mm. in diameter).

Another method of providing lateral tension is illustrated in FIG. 6. Edges 39 and 40 (not shown) may be rolled and twisted 44, and secured with tape, glue or other adhesive material to form package 36a.

Another method of providing lateral tension is illustrated by FIG. 7. Edges 39 and 40 (not shown) may be stretched and secured as a substantially linear collar or strip 46 on either side of package 36b, adhered with, for example, glue or heat sealed.

The tension along wrapper sheet 34 on package 36 also including package 36a and 36b provided by the particular disposition of the wrapper sheet 34 as described above, acts to reduce the overall surface area of package 36, reducing the amount of space necessary for storage and transport. The presence of trapped gases (e.g., air) within package 36, even with a number of small perforations 42 in the wrapper sheet 34, helps to reduce the possibility of damage to mature sprouts during storage, transport and handling by enhancing the resilience of the package 36. That is, the presence of trapped gases may allow package 36 to act as a resilient "bubble", repulsing objects which may threaten temporary deformation.

The crowded coalignment of the sprouts 19 within package 36 may discourage or retard excessive growth of sprouts (which may cause an undesirable taste and appearance) which might otherwise occur in a more expansive apparatus during storage or transport where conditions of temperature, light and humidity may be conductive to further growth.

In another embodiment, as shown in FIGS. 9–10D, sprouts 19 are grown on a nonporous base 50 containing several openings for drainage within a germination tray 10a in a fashion which allows the sprouts 19 to be arranged in a cohesive bundle which may then be wrapped within a cover means 34 for transport or storage prior to consumption—in accordance with the invention.

In FIG. 9, a five sided tray 10a may be constructed of four rigid side members 14a made of, for example, wood or plastic or other similar materials to provide lateral support for growing sprouts, and a substantially rigid and preferably smooth and nonporous bottom member 50. Bottom member 50 may be made of plastic or similar materials and may have openings 52 at the juncture of the bottom member 50 and side members 14a to facilitate drainage of excess moisture.

Seeds 18 which have been allowed to soak in warm water for a period of time (e.g., 70°–80° F. for 6–8 hours) may be placed evenly along bottom member 50 in a substantially uniform manner, as in FIG. 10A. The tray 10a may then be placed in an environment which will encourage germination. For example, an environment which provides a relative humidity of 60–80% at 65°–80° F. will encourage the germination of alfalfa seeds. The tray 10a may then be misted from above periodically (e.g., four times per day) as in FIG. 10A by watering can 28. To facilitate drainage of excess moisture collected within tray 10a, tray 10a may be tilted at an angle $\beta$ slightly away from the horizontal plane, as in FIG. 10B. In this way, excess moisture may be released through bottom member openings 52. Angle $\beta$ may be 3° to 40°.

A temporary cover 26 made of, for example, polyethylene film or of moistened paper towels may be placed loosely over the top of tray 10a to help retain a desirable growth environment as needed and repositioned after each misting, as in FIGS. 10B and 10C.

As plant sprouts 19 germinate, gravity and the flow of excess moisture encourage the extension of plant root parts 19a in a direction toward the lower edge of tilted tray 10a. As tray 10a is tilted during the germination process, as in FIG. 10B, plant root parts 19a may extend toward edge 50b, the lower edge of tray 10a. The contiguous, uniform placement of seeds 18 over bottom member 50 may encourage root parts 19a of neighboring sprouts 19 to become intertwined as they grow. The entanglement of neighboring root parts 19a may be further encouraged by altering the angle at which the tray is tilted several times during germination (e.g., once each day for 3–4 days). This may be illustrated in FIG. 10C, where the lower edge of tray 10a is now edge 50a. This alteration in the direction of root extension may facilitate further entanglement of root parts 19a resulting in a kind of woven entanglement of contiguous and neighboring sprouts as in FIG. 10C. The angle at which tray 10a may be tilted should be far enough away from the horizontal plane to encourage free drainage of excess moisture along bottom member 50 and through openings 52 without displacing evenly spread seed 18 or sprouts 19 (e.g., 3°–40° away from the horizontal plane may be ideal).

The mature sprouts 19 may be removed from tray 10a by placing a sheet of rigid material 32 over the top of tray 10a and inverting tray 10a and rigid sheet 32 together in a manner which minimizes the movement of plant sprouts 19 within tray 10a. The inverted tray 10a and rigid sheet 32 may be placed on platform 33 as in FIG. 10D. Inverted tray 10a may be lifted up and away from plant sprouts 19 as in FIG. 10D, leaving inverted plant sprouts 19 free standing on rigid sheet 32 and held together by the interwoven englanglement of root parts 19a on top. This configuration may facilitate wrapping and handling as shown in FIGS. 2D–7.

As described in copending U.S. patent application Ser. No. 58,820, filed July 19, 1979, a germination pad may be made of one or more layers of a three-dimensional skeletal structure of strands preferably of a substantially hydrophobic material (e.g. hydrophobic polyurethane) with a substantially constant percent of void (e.g., 97%) and a high degree of permeability and a low resistance to air flow.

A preferred material for germination pad may be a flexible, resilient, elastomeric, open cell, fully reticulated foam of a substantially hydrophobic material, such as polyurethane. Scott polyurethane filter foam, Scott Paper Company, Chester, Pa., is highly effective. Pore sizes may be varied to accommodate different sizes and types of sprouts (e.g. pore size 20 PPI may be used with alfalfa sprouts). Operative pore sizes range from about 8 to 50 PPI (pores per inch).

An itemized list of the properties of the preferred germination pad may be useful in the description of the embodiments of the invention.

Pad Structure

A. It has an open cell, fully reticulated, three-dimensional skeletal structure of strands with a substantially constant percentage of void space, high degree of permeability, low resistance to air flow, relatively large internal surface area.

1. Moisture may adhere to surface area of strands without substantially restricting the free flow of air and other gases. This promotes desirable levels of humidity without restricting the flow of air (which provides oxygen for the process of respiration) or the efflux of waste gases (e.g., carbon dioxide and other gases, the presence of which may retard or restrict germination—see Copeland, infra, Chapter 4).

2. The fully reticulated structure of strands allows a more uniform dispersion of droplets of moisture through the pad and minimizes the possibility of moisture buildup at any one particular spot which may breed harmful organisms.

3. The skeletal structure/size of pores may be fabricated to accommodate the size and type of sprout as well as growing conditions (e.g., level of humidity in the growing environment).

4. The presence of air flowing through a moist pad allows the germination pad to act as an evaporative cooling device and facilitates the cooling of the sprouts which tend to heat up as they grow (see L. O. Copeland, *Principles of Seed Science and Technology*, Burgess Publishing Co., 1976, Chapter 4).

B. Hydrophobic, nonabsorbent.

;b 1. This is to facilitate drainage and the efflux of wastes, impurities and excess water which could more readily cling to an absorbent, hydrophilic material and promote the growth of undesirable organisms. A hydrophilic pad where the material (strands) may actually swell upon exposure to moisture would restrict the air space and air flow necessary for respiration and the efflux of waste gases and other waste materials.

2. It facilitates the regulation of moisture/humidity as the sprout parts (roots) grow into the pad. Since moisture clings to or is absorbed by hydrophilic material, it would be difficult to remove excess moisture from the pad without damaging growing sprout parts (i.e., one cannot "wring it out").

3. Substantially uniform pores of a size substantially large to accommodate growing sprout parts (roots) of desirable dimensions would substantially preclude retention of moisture by capillary attraction which may occur in fully reticulated foams made of hydrophobic materials but of relatively small pore size (e.g., pore sizes substantially smaller than 50 PPI).

C. Flexible, resilient, elastomeric, not easily broken apart, resistance to and recovery from deformation.

1. Resistance to and recovery from deformation aids in cushioning sprouts from damage in handling, transport, etc.

2. It facilitates removal of sprouts (roots) from pad.

3. It facilitates the possible reuse of the pad.

4. Allows for the accommodation of growing sprout parts (e.g. roots) without altering the general shape of the pad (i.e., the structure of surrounding strands is not substantially altered).

5. It facilitates the fabrication of the germination pad into shapes which accommodate different containers, particularly as sprouts grow and expand.

I claim:

1. A method of growing and packaging sprouts comprising the steps of providing a container having a floor for supporting seeds, and upstanding walls encircling the floor, the floor containing openings that permit ready drainage of excess water, spreading seeds substantially uniformly over said floor, growing the seeds into sprouts by watering the contents of the container and subjecting them to an environment conducive to good growth, but controlling the growth to cause the sprouts to grow together as a compact bundle in the container, removing the bundle from the container, and securing the bundle in a closely encircling wrapper.

2. A method as set forth in claim 1, wherein the container is inverted to remove the bundle of sprouts.

3. A method as set forth in claim 1, wherein a light is directed upwardly through the bottom of the container when the seeds are spread to facilitate even distribution of the seeds on the bottom of the container.

4. A method as set forth in claim 1, wherein prior to applying the wrapper, the bundle removed from the container is placed on an open supporting surface.

5. A method as set forth in claim 1, wherein the floor of the container comprises a porous pad.

6. A method as set forth in claim 1, wherein the container is inclined at different angles during the growth to direct the drainge of water differently and cause the sprouts to entangle themselves with each other during growth.

7. A method as set forth in claim 1, wherein the wrapper is secured about the sprouts under tension to circumflex the sprouts whereby the packaged sprouts are compacted, arched and crowded to inhibit distasteful growth, and gases are trapped whereby the circumflexed sprouts and gases lend strength and resiliency to a package of the circumflexed sprouts.

8. A method as set forth in claim 7, wherein the wrapper is perforated for discharging excess gas.

9. A method as set forth in claim 7, wherein the wrapper is a sheet having free ends that are ultimately sealed.

10. A method as set forth in claim 9, wherein the ultimate sealing includes the step of folding.

11. A method as set forth in claim 9, wherein the ultimate sealing includes the step of heat sealing.

12. A method as set forth in claim 9, wherein the ultimate sealing includes the step of crimping.

13. An apparatus for growing sprouts from seeds comprising a container having a translucent floor for supporting the seeds, means for supporting the container with its floor level, a light source under the container positioned to direct light upwardly through the translucent floor, and distributing means in said container for spreading the seeds at any location shown by the light to contain too high a seed concentration.

14. A package of seed sprouts comprising a bundle of sprouts substantially aligned with each other, a wrapper sheet secured around the sprouts whereby they are circumflexed and substantially compacted under tension and gases are trapped within the wrapper sheet whereby strength, resiliency and inhibition of distasteful growth result.

15. A package as set forth in claim 14, wherein the sprouts are entangled in a porous pad.

16. A package as set forth in claim 14, wherein the sprouts are entangled with each other.

17. A package as set forth in any one of claims 14, 15 or 16, wherein the wrapper sheet is perforated for releasing excess gas pressure.

18. A package as set forth in any one of claims 14, 15 or 16, wherein the ends of the wrapper sheet are sealed to each other.

19. A package as set forth in any one of claims 14, 15 or 16, wherein the ends of the wrapper sheet are folded together.

20. A package as set forth in any one of claims 14, 15 or 16, wherein the wrapper sheet is transparent.

* * * * *